July 12, 1966    J. DE LA CIERVA ETAL    3,260,893
ELECTROSTATIC DISCHARGING SYSTEM FOR AIRCRAFT
Filed Jan. 6, 1964    5 Sheets-Sheet 1
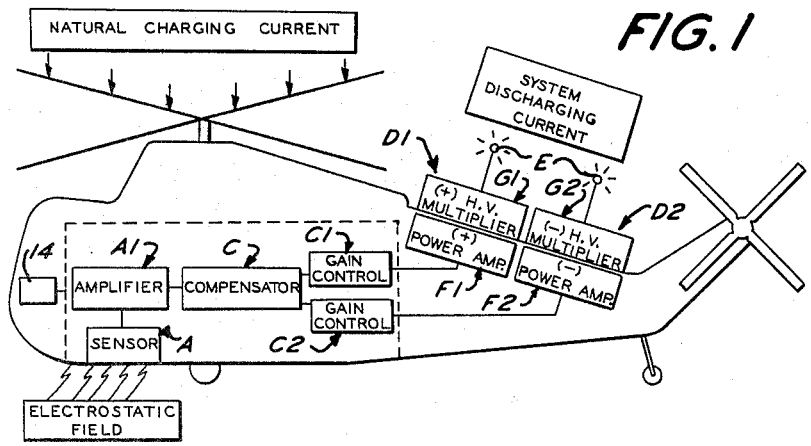
FIG. 1
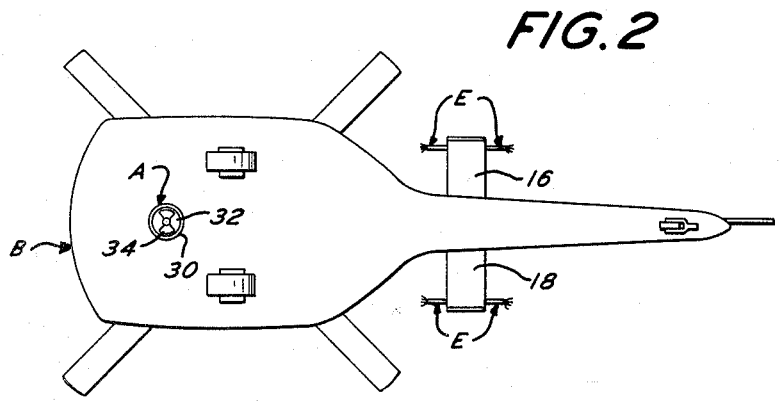
FIG. 2
FIG. 3     FIG. 4
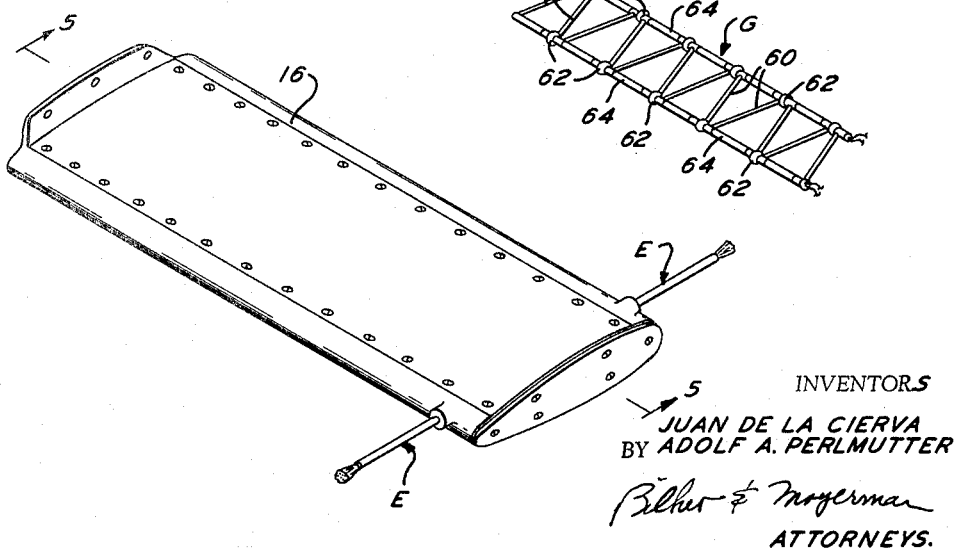
INVENTORS
JUAN DE LA CIERVA
BY ADOLF A. PERLMUTTER
ATTORNEYS.

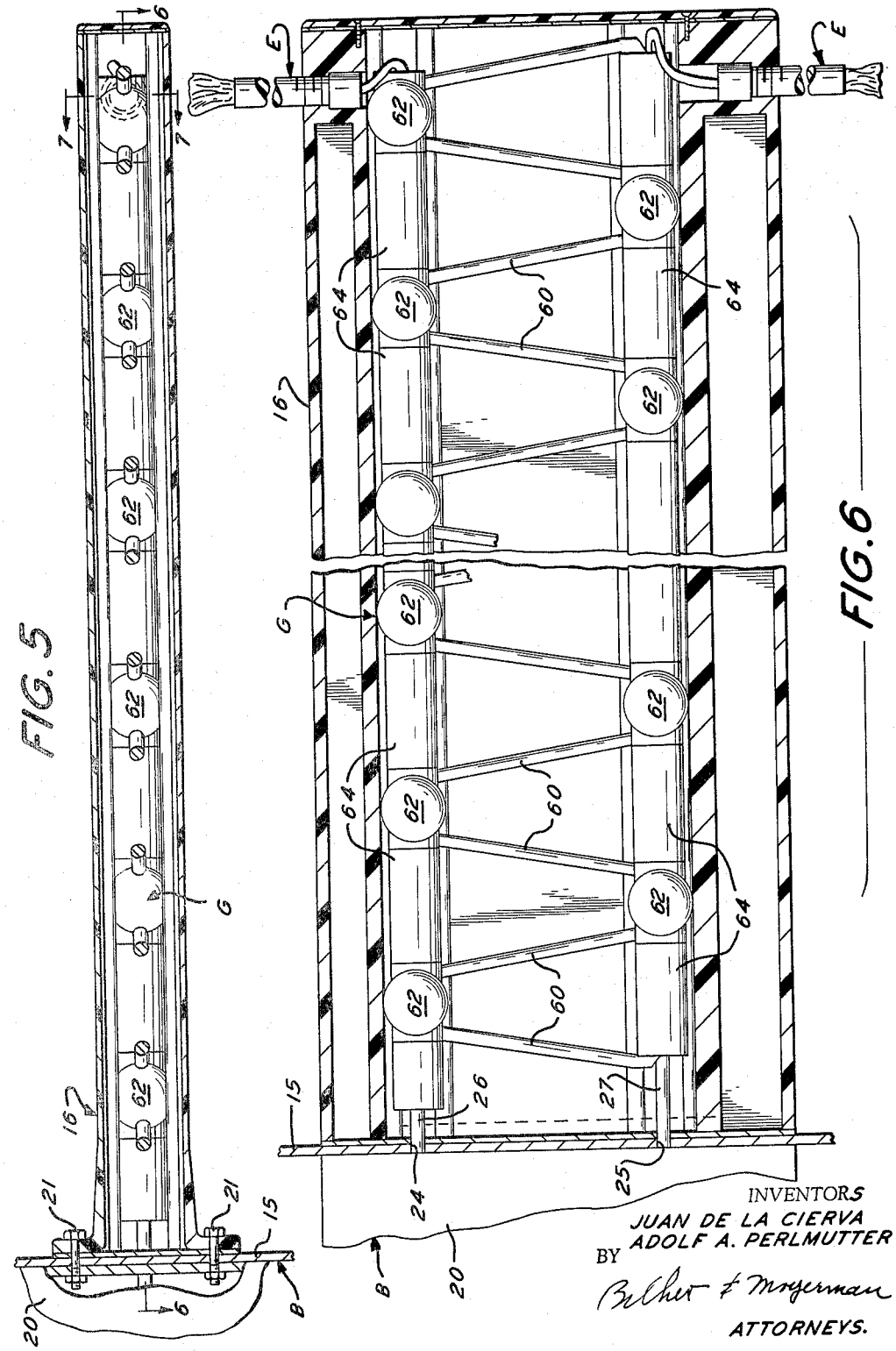

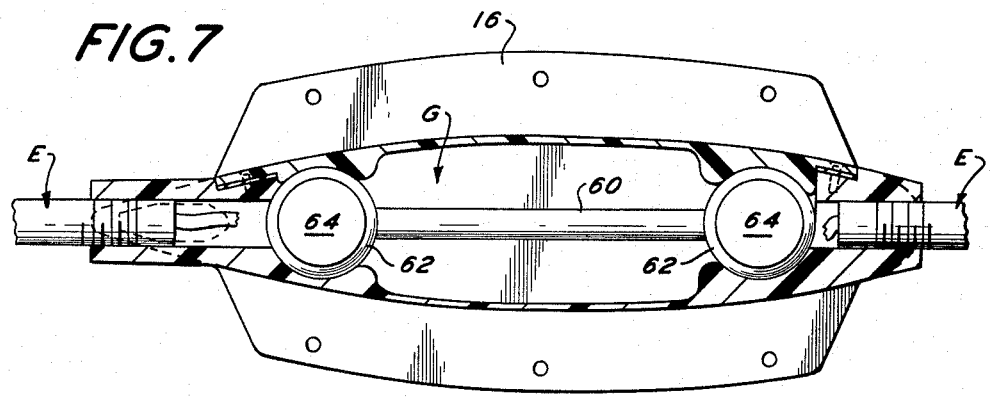
FIG. 7
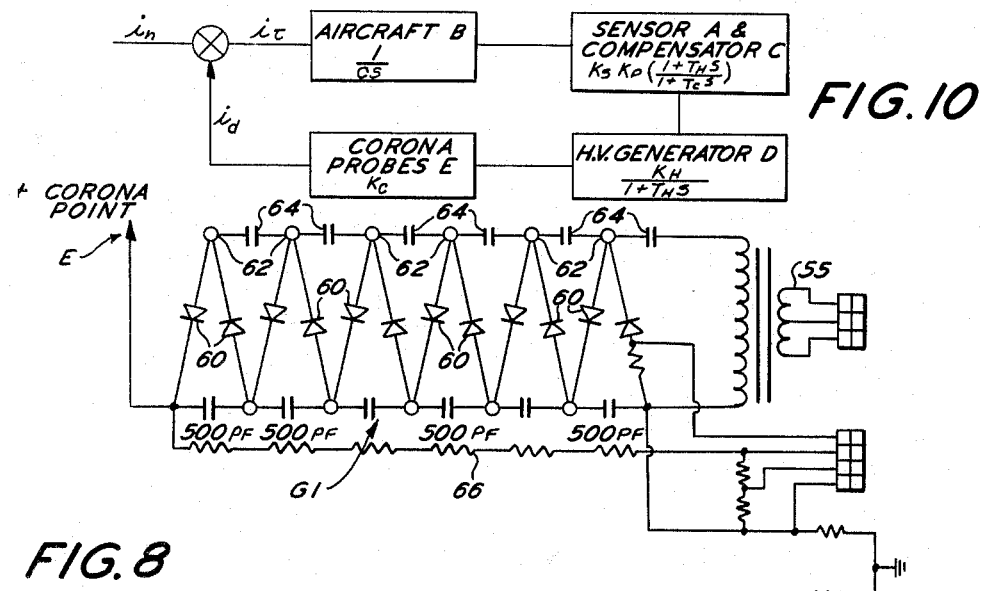
FIG. 10
FIG. 8
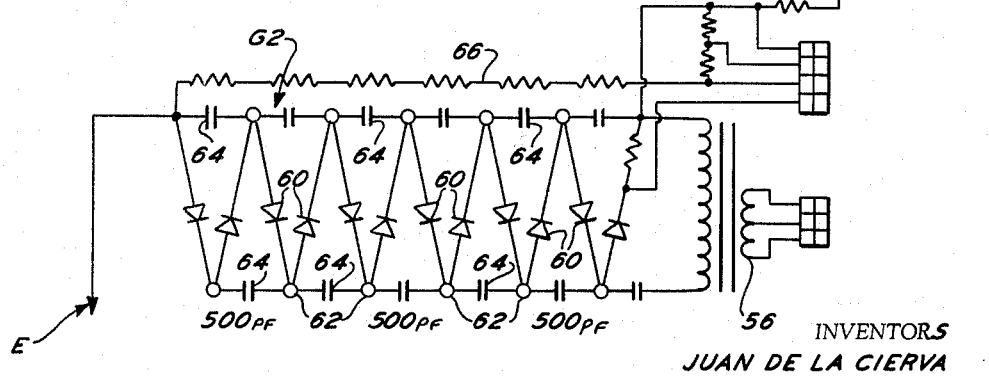
INVENTORS
JUAN DE LA CIERVA
ADOLF A. PERLMUTTER
BY
ATTORNEYS.

INVENTORS
JUAN DE LA CIERVA
ADOLF A. PERLMUTTER

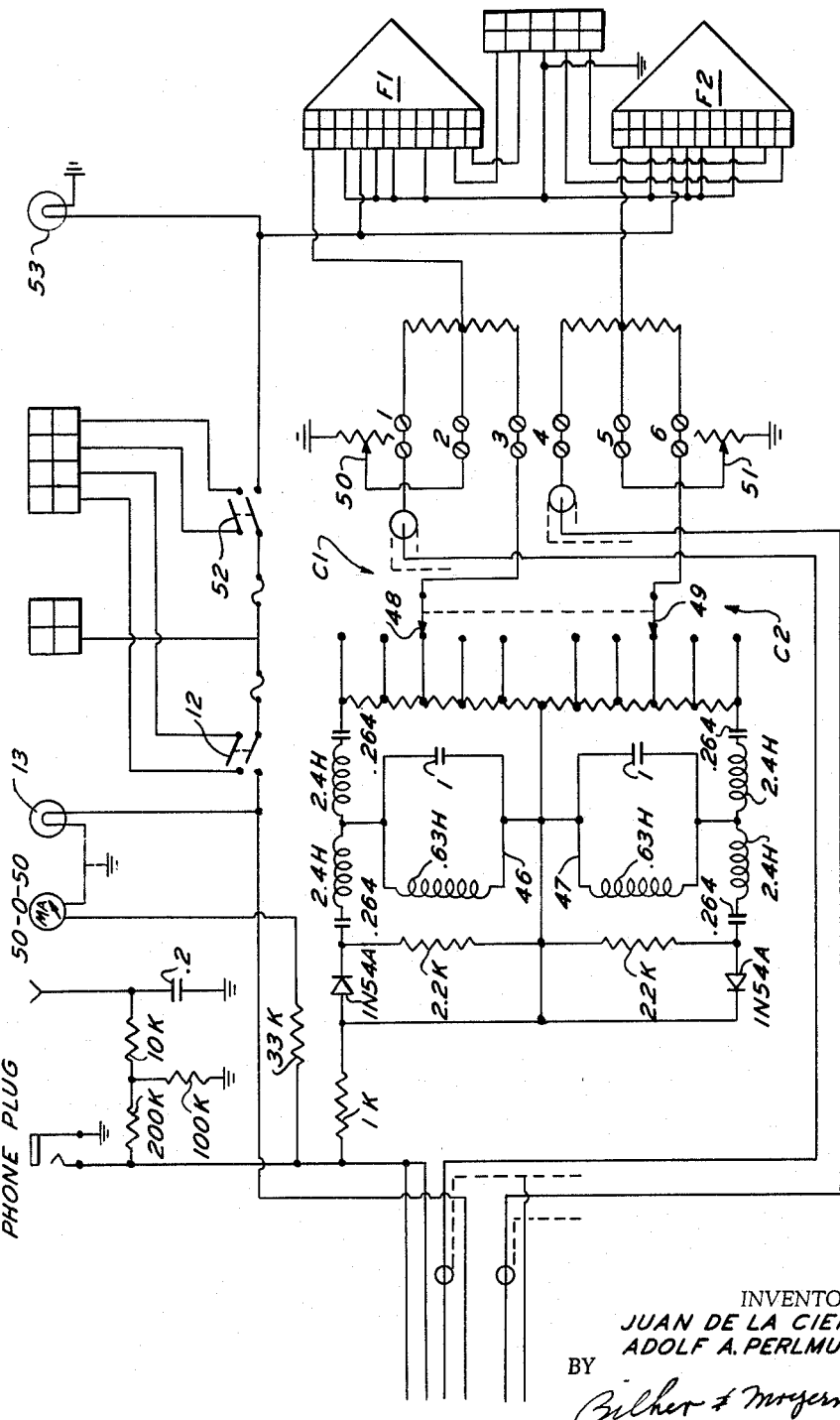

3,260,893
ELECTROSTATIC DISCHARGING SYSTEM FOR AIRCRAFT
Juan de la Cierva, Philadelphia, and Adolf A. Perlmutter, Dresher, Pa., assignors to Dynasciences Corporation, Fort Washington, Pa., a corporation of Pennsylvania
Filed Jan. 6, 1964, Ser. No. 335,785
15 Claims. (Cl. 317—2)

This invention relates to an electrostatic discharging system for aircraft, and more particularly relates to an improved apparatus for sensing and discharging static electricity in fixed wind, vertical-take-off-and-landing, and rotary wing aircraft.

The accumulation of electrostatic charge generated in aircraft from "frictional" effects and atmospheric conditions gives rise to a number of operational problems. These problems are: (1) radio interference with aircraft communication and navigation systems; (2) electrical shock hazards connected with aircraft, particularly helicopters, hovering close to the ground during cargo handling or rescue missions; (3) a possibility of spark ignition of fuel-impregnated air; and (4) the detonation of externally carried weapons and explosives.

At the present time, it appears that static electricity discharging devices for large helicopters must have a discharging or neutralizing capability exceeding 100 microamperes. It has been found that a helicopter hovering near the ground creates the charging current with a polarity and magnitude depending on the nature and volume density of atmospheric particles flowing through the rotor system. The charged helicopter is equivalent to a capacitor, one plate being represented by the aircraft and the other plate by the ground. The capacitance is known to be a function of the operating altitude.

The accumulation of these electrostatic charges in aircraft results from a number of independent processes, for example, triboelectric static charging (autogenous static charging which originates by the cumulative charge transfer taking place between the aircraft and solid or liquid particles in the atmosphere), induction static charging (the induced charge due to atmospheric electrostatic potential gradients along the aircraft flight path such as occurring between two cloud formations charged with opposite polarities) and exhaust gas ionic unbalance (polarity unbalance between positive and negative ions emerging from the aircraft with the exhaust gases whose distribution depends on such factors as the fuel chemical composition to the throttle setting).

The importance and severity of each of the foregoing charging processes, as well as the effect in communicational noise, personnel hazards, ignition sparking of fuel-air mixtures and corona ignition of explosives, is dependent upon the type of aircraft under consideration and upon its mission profile. It also has been determined that the magnitude of the charging current is directly related to the aircraft size and operational environment.

Noise or communication "hash" is a consequence of uncontrolled corona discharge taking place through natural corona points of a charged aircraft. Since the corona phenomenon is essentially a discontinuous process, it produces a radio frequency field of a wide spectral band. The charge transfer between corona points and the space charge takes place in small bursts having rise and decay times in the order of several nano-seconds ($10^{-9}$ second) and magnitudes of a few micro-microcoulombs. The harmonic content of such a pulse is normally high, and, consequently, so is the resultant radiated field strength.

In order to improve the above-described conditions, the discharging system must be such that all corona discharge will flow through the system probes, and hence, no corona may flow through natural points on the aircraft. The corona probe of the discharging device must not only minimize radio-frequency noise, but in addition, the probe must have a very good D.-C. and low frequency discharging performance in order to keep the aircraft potential with respect to the atmosphere at a level below the corona threshold of wing and propeller tips or other natural discharging points on the aircraft. Finally, the complete discharging system performance must be sufficient to maintain this low aircraft potential, even in the presence of relatively rapid fluctuations of natural charging currents or rapidly changing atmospheric potential status.

A characteristic which typifies the triboelectric charging of aircraft consists of the fact that the rate of charge, or natural charging current, is independent of the aircraft potential with respect to the atmosphere. This is so because the particle, before hitting the aircraft, has no electrical charge. The result is that the particle space distribution is unaffected by the electrostatic field of the approaching aircraft. These particles of dust, water, snow, ice, etc., have a wide range of dielectric constant. When one of these particles comes in contract with the aircraft skin, charge transfer occurrs until the difference of contact potential between the particles and aircraft is neutralized by the electrostatic field resulting from the charge transfer. Consequently, when the particle separates from the aircraft due to aerodynamic and intertial forces which largely overcome the electrostatic attracting force resulting from the charge transfer process, some of the aircraft electrons are lost or additional electrons are added to it, depending upon the relationship between the dielectric constants of the particle and the aircraft skin in the area of contact. As has been mentioned before, the triboelectric effect on rotary-wing aircraft is most significant, and the magnitude and the polarity of natural charging current created by this effect must constantly be evaluated and transmitted by the sensing unit into a signal to operate the corresponding neutralizing generator all with a definite speed of response so that cancellation will be effective.

It has been determined that the threshold of the sensitivity of human beings to static energy is in the order of one millijoule and also that the minimum energy requirements to ignite a fuel-air mixture has also been established as one millijoule. Consequently, a reasonable criterion for a satisfactory discharging system requires the maintaining of the aircraft at an energy level below one millijoule under all expected conditions of natural charging current, natural charging fluctuations, and atmospheric potential variations existing along the aircraft's expected mission profiles.

The triboelectric charging process is the primary charging process affecting hovering helicopter aircraft. This is because the down wash flow creates clouds of dust, water, snow, etc., part of which recirculates through the aircraft rotors, propellers and/or engines, and the resultant high rate of occurrence of particle-aircraft collisions result in a high rate of triboelectric charging. Natural charging currents up to 120 microamperes have been measured in helicopter operations. Fixed wing and/or high speed aircraft will also be affected by triboelectric charging. However, the lack of recirculation on the environments of fixed-wing aircraft will probably reduce quite substantially the charging rate attributable to triboelectric effect. Nonetheless, these types of aircraft are susceptible to induction charging and this predominates when the aircraft flies in an atmosphere having high potential gradients.

Induction static charging is the process in which induction of the charge results from atmospheric electrostatic potential gradients along the aircraft flight path. For example, when an aircraft in a horizontal flight path crosses an atmospheric electrostatic field, also horizontal, such as one which would be expected to occur between two cloud formation charged with opposite polarity, assuming that there is a potential distribution resulting from a uniform field and that the space is equipotential within the clouds themselves, as shown by a zero field and the corresponding zero potential gradient in these zones, the potential of the atmosphere surrounding the aircraft (assuming it to be undisturbed by the aircraft charge) will be:

$$P_a = P_A - \frac{2P_A}{D} Vt \qquad (I)$$

where:

$P_a$=potential of atmosphere around the aircraft (volts)
$P_A$=potential of electrostatically charged cloud (volts)
$D$=distance between charged clouds (meters)
$V$=aircraft velocity (meters/second)
$t$=time (seconds)

The absolute potential of the aircraft can now be calculated as follows:

$$P_v = P_A - \frac{1}{C}\int_0^t i_n dt \qquad (II)$$

where:

$P_v$=absolute potential of aircraft (volts)
$C$=capacitance (farads)

The capacitance C is an absolute value of capacity assigned to each particular aircraft when flying at a high altitude. The value of the absolute capacitance assigned to each particular aircraft may be determined by computation through calculation of surface area, volume, shape factor and dielectric constants of all components as an isolated body. More practically, the capacitance is determined empirically through the actual measurement of the particular aircraft's capacitance at an altitude in excess of five hundred feet. In the experimental evaluation of the aircraft capacitance, for example, a helicopter, a usual capacitance bridge is taken aloft, one end of the bridge being secured to the airframe and the other end of the bridge being connected to earth ground through a long cable dangling from the vehicle. In the experimental determination, it should be noted that the absolute capacitance of each aircraft, when it is above five hundred feet over the earth, approaches asymptotically a finite limiting value.

The natural discharging current, $i_n$, is a function of the potential difference between the aircraft and the atmosphere, as well as of the equivalent resistance, R, between them.

It can be shown that:

$$P_v \div \frac{1}{RC}\int_0^t P_v dt = P_A\left[1 + \frac{t}{RC} - \frac{Vt^2}{DRC}\right] \qquad (III)$$

whereby Equations I and II are valid over the distance between the two clouds.

Once the aircraft enters the negatively charged cloud the following analysis is applicable:

$$P_a = -P_A \qquad (IV)$$

or $$P_v = -P_A - \frac{1}{RC}\int_0^t (P_v - P_a) d\tau \qquad (V)$$

where $$\tau = t - \frac{D}{V}$$

The difference in potential between the aircraft and the atmosphere, $P_v - P_a$, can now be obtained in two parts, the first part consisting of the time interval, $$0 \leq t \leq \frac{D}{V}$$

and the second part is for $t > D/V$.

Thus, the first part solution can be shown to be:

$$P_v - P_a = \frac{2RCV}{D} P_A \left[1 - e^{-\frac{t}{RC}}\right] \qquad (VI)$$

and the second part ($t > D/V$):

$$P_v - P_a = \frac{2RCV}{D} P_A \left[1 - e^{-\frac{D}{VRC}}\right] e^{-\frac{\tau}{RC}} \qquad (VIII)$$

A plot of the foregoing equations reveals the effect of the several parameters affecting the induction charging process, and it can be noted that the rate of charge of the aircraft increases with the aircraft speed. It can also be concluded that the time period during which a specified level is exceeded increases with aircraft speed.

The third process contributing to the electrostatic charge of aircraft consists of the unbalance between positive and negative ions emerging from aircraft with the exhaust gases. These ions are generated in the combustion process, and its polarity distribution depends on a number of factors, ranging from the chemical composition of the fuel to the throttle setting. While the resultant charging current is difficult to predict for a specific aircraft, it can be shown by experimental evidence that the contribution of this process to the total electrostatic charging is of comparatively minor nature. Hence it can be proven that a discharging system which will neutralize an aircraft receiving electrostatic charge by the triboelectric and induction processes will also neutralize whatever charge is added (or subtracted) by the exhaust gas ionic unbalance.

The determination of the maximum level of discharging current required of a discharging system in itself, however, is not sufficient to define the performance characteristics of a discharging system. It is also most significant that the speed of response of the discharging system be considered. In this connection, a pertinent factor is the absolute capacitance of the aircraft itself which ranges from 280 to 520 picofarads for various helicopters, and from 640 to 6900 picofarads for various fixed wing aircraft, the absolute capacitance being defined as the amount of electrostatic charge (coulombs) stored in the aircraft when flying at high altitude, when the total energy stored in the aircraft is unity (one joule).

Of utmost importance in the design of a static discharging system is the necessity of a very rapid response together with reasonably low potential overshoots. That is, the system must sense the polarity and magnitude of the charge imposed upon the aircraft and transmit this intelligence which is to be converted into a neutralizing current of proper magnitude and polarity so that the sum of the charging and discharging currents will be within the limits described above. The value of the overall system gain must be necessarily high in order to maintain at a low value the residual aircraft voltage. At the same time, the time constants of the system must be made as low as possible in order to achieve reasonable system damping. It must be pointed out, however, that the design of a high voltage generator having a time constant in the order of .04 second or less, as may be required in high gain discharging systems to achieve proper damping, presents a number of interrelated problems. The output impedance of the generator must be very high if the power involved is to be small. The equivalent impedance of the corona point probes is in the order of $10^9$ ohms, and any additional impedance paralleled with the probes will only increase the required power input as well as impose additional requirements to the rectifying and multiplying elements (diodes and capacitors) of the unit.

If the high voltage generator were to be installed in the aircraft cockpit, high voltage wiring must be run between the generator and the corona point probes. Even if the length of this wiring is kept very short, some capacitance will be associated with this wiring. Typically, a fifteen foot high voltage cable for 100 kilovolts has a capacitance of 500 picofarads. The time constant of the high voltage unit (at least when the input voltage decreases) will be the product of the output resistance times the output capacitance.

Not only must an aircraft electrostatic discharging system channel all the required discharging current through its high voltage corona point probes, but also the design of these probes must be such that the interference noise generation is minimized. Furthermore, the location of the probes relative to the antennas must be chosen in such a manner that its electromagnetic coupling is reduced as much as possible. Other factors affecting the generation and propagation of the noise created in the discharging device consists of its location on the aircraft with respect to the antennae and noise-sensitive elements of the communication and navigation systems.

The prior conventional static electricity dissipating systems and techniques for aircraft employed passive wicks which have proved inadequate in that the discharging process was not selective. That is, in the passive or static system the neutralization and corona discharge could just as well occur from any natural point on the aircraft without expressly passing through the wicks themselves. In addition the earlier systems utilized large capacity high voltage generators but neglected speed of response. With the advent of higher capacity generators, speed of response has become more and more significant because of inherent built-in inertia producing either insufficiency of discharging current or overshoots. This problem is further magnified by the size of the high voltage generator which if placed close to the low voltage system (internal mounting) results in appreciable impedance losses and time lags because of the increased length of high voltage cable to the probes or wicks themselves. Moreover, juxtaposition of the low and high voltage units within the aircraft itself necessarily requires a greater degree of shielding to protect not only personnel from shock hazards but also to minimize noise and other communication equipment disturbances. As a consequence, the internal mounting systems results in loss of valuable cargo or personnel space within the aircraft, for some aircraft configurations, while other aircraft configurations are not affected by the volume requirements of the high voltage generators. For instance, in some single rotor helicopters, the tail boom of the aircraft provides space otherwise unused, which can accommodate, very conveniently, internally mounted generators.

It is therefore an object of this invention to provide an active dynamic electrostatic discharging system for aircraft which will completely eliminate the danger of static electricity discharge to personnel and fully protect the aircraft from explosions of volatile liquids as well as premature ignition of explosive stores.

Another object of this invention is to provide an electrostatic discharging system which will essentially exclude problems due to radio frequency interference caused by uncontrolled static discharge from aircraft surfaces.

Another object of this invention is to provide an electrostatic discharging system which is fully effective under all environmental conditions including arctic winters and desert summers, wind, rain, dust, sleet and/or snow.

Still another object of this invention is to provide an aircraft static discharging system in which the electromagnetic coupling between the noise sources of the antistatic system and the antennae of the communications and navigation receivers will be minimal.

Yet another object of this invention is to provide an aircraft static discharging system which will sense all triboelectric and induction charging currents and rapidly neutralize such charging currents without potential overshoots.

A further object of this invention is to provide an electrostatic discharging system which will channel all of the required discharging current through the corona probes or wicks.

A still further object of this invention is to provide an electrostatic discharging system having a greater capacity but yet smaller in size.

Yet a further object of this invention is to provide an active wick, compact, dynamic electrostatic discharging system which will minimize noise generation and impedance losses, save valuable cargo and personnel space, and afford a high speed of response without interfering with communication equipment or causing high voltage hazards to personnel.

Another object of this invention is to provide an electrostatic discharging system which is simple and automatic in operation, requiring no adjustment, and having but a single "fail-safe" lamp to indicate whether the system is functioning properly.

Other objects of this invention are to provide an improved device of the character described that is easily and economically produced, which is sturdy in construction and both highly efficient and effective in operation.

With the above and related objects in view, this invention consists of the details of construction and combination of parts as will be more fully understood from the following detailed description when read in conjunction with the accompanying drawing in which:

FIGURE 1 is a block diagram of a static discharging system embodying this invention and showing the relationship and positioning of the circuit components within a helicopter which is receiving a natural charging current during normal flight.

FIGURE 2 is a bottom plan view of the helicopter showing a sensor unit embodying this invention.

FIGURE 3 is a perspective view of a helicopter external air foil mount containing a high voltage multiplier and discharging wick probes of this invention.

FIGURE 4 is a perspective view of one of the high voltage multiplier units prior to assembly within the external mount.

FIGURE 5 is a sectional view taken along lines 5—5 of FIGURE 3.

FIGURE 6 is a sectional view taken along lines 6—6 of FIGURE 5.

FIGURE 7 is a sectional view taken along lines 7—7 of FIGURE 5.

FIGURE 8 is an electrical schematic diagram of the high voltage multiplier circuit.

FIGURES 9A and 9B are electrical schematic diagrams of the sensor, control, compensating, amplifying and low voltage circuits embodied in this invention.

FIGURE 10 is a closed loop servo-block diagram of the electrostatic discharging system and illustrating the transfer functions thereof.

Figure 9A:
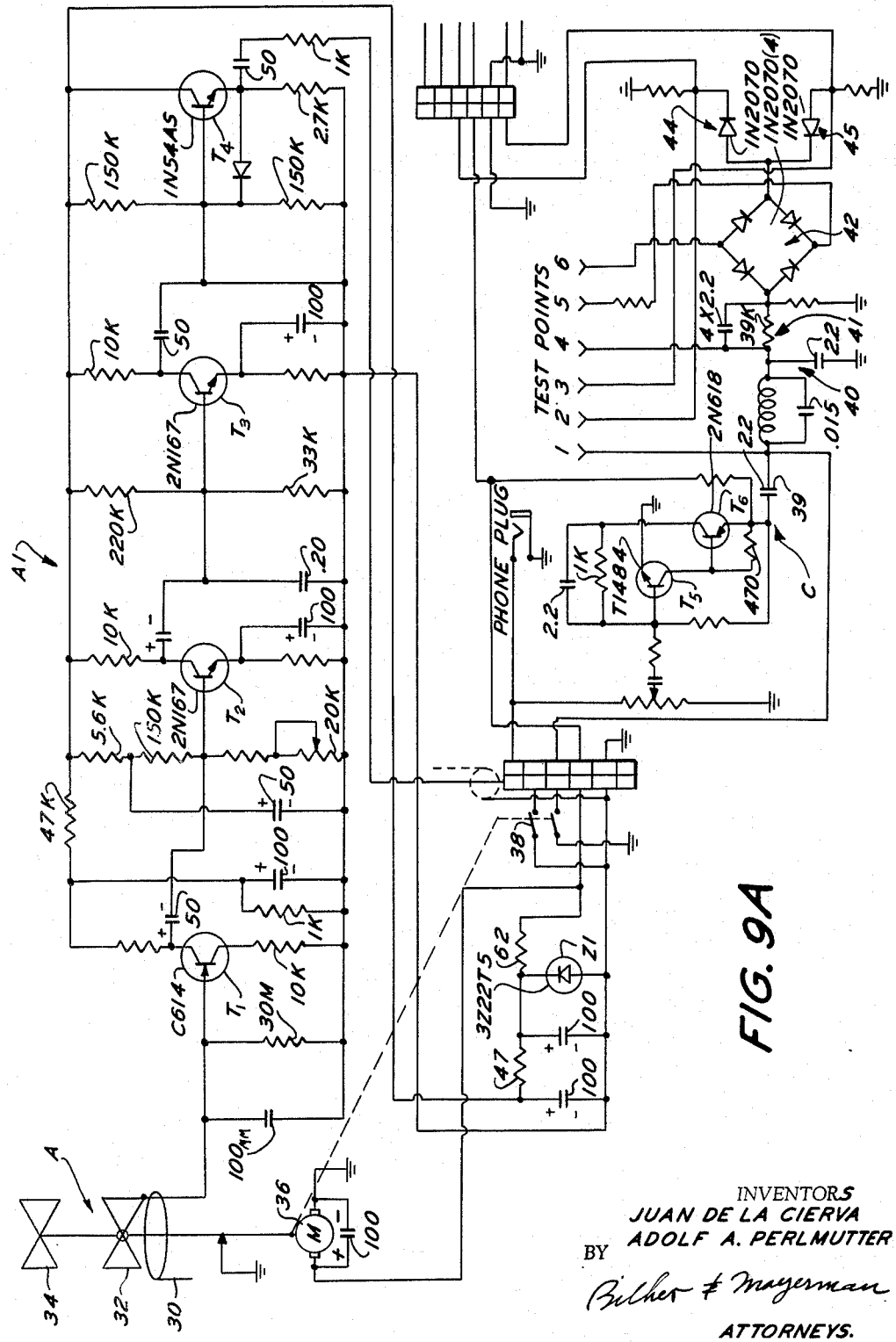

Referring now in greater detail to the drawings in which similar reference characters refer to similar parts, the static discharging system of the instant invention basically comprises a sensing unit, generally designated as A which measures the potential of the aircraft B as well as its polarity with respect to the electrostatic field immediately surrounding the aircraft, a compensator circuit C which receives an amplified signal from the sensor and modifies this signal for transmittal to appropriate positive or negative high voltage generators D which are directly coupled with externally mounted corona discharge points or wicks E. See block diagram of FIGURE 1.

The static electricity discharger herein described is entirely automatic in its operation and has but a single control, an "on-off" switch 12 which is mounted on the pilot's control panel 14. It effectively consists of four units: the pilot's control panel 14, the low voltage sensor unit A which is flush mounted on the aircraft skin 15, and two high voltage generator units D (one for each polarity). Each high voltage generator is comprised of two parts; servo-power amplifier units F1 and F2 which are mounted inside the aircraft B and multiplier units G1 and G2 which in the embodiment shown are mounted outside the aircraft within airfoil nacelles or cells 16 and 18 on either side thereof. The cells 16 and 18 are bolted at 21 to control boxes 20 and 22 containing the respective power amplifier units F1 and F2 with the skin 15 of the aircraft B therebetween. See FIGS. 5 and 6. Openings 24 and 25 are made in the skin 15 to permit passage of electrical connections or cables 26 and 27. It is to be observed that this two-piece design allows for complete isolation of the high voltage circuits (200,000 volts) outside the aircraft as a safety precaution. Note also that the proximity of the power amplifiers F1 and F2 to the corresponding multipliers G1 and G2 reduces the length of cable therebetween to a minimum so as to cut power and impedances losses to a minimum. Furthermore, exterior mounting of the multipliers G1 and G2 places the very high voltage outside the aircraft and immediately adjacent the probes E, again minimizing not only power losses, but also avoidably reducing communication disturbance which is likely to interfere with radio and other electronic equipment aboard the aircraft. While it is possible to mount the multipliers inside the aircraft, the attendant communication shielding and high voltage protective measures would require large housings which for some aircraft would seriously detract from available cargo, equipment and personnel space.

Referring now to FIGURES 2, 3, 5 and 6, the multiplier cell housings 16 and 18 are in the shape of an airfoil to hold aerodynamic drag to a minimum. These are detachably connected to the exterior of the aircraft B by the bolts 21 so that the multipliers G1 and G2 themselves can be entirely removed from the aircraft during missions where static discharging is not required. At each end of each cell are the two probes E which act as corona points from which the discharging system emits the current necessary to maintain the aircraft B in a safe condition. The cell housings 16 and 18 are of a suitable plastic material, as indicated by the crosshatching in the sectional FIGURES 5, 6 and 7 so as electrically to insulate the probes E from the aircraft frame B. In addition, the cell housings space the tips of the probes away from the aircraft so that the corona discharge does not flow back upon the aircraft proper but is exhausted into the atmosphere.

In essence, the present electrostatic discharger is a feedback amplification system which is monitored at the pilot's control panel 14 and is divided into three sections: (1) a low voltage unit, including the sensor A along with its amplifier A1 and the compensator C together with its associated gain control units C1 and C2, (2) the positive high voltage generator D1, and (3) the negative high voltage generator D2. These high voltage generators are identical except for the polarity of the output.

The present invention contemplates an active or dynamic system for constantly and continually maintaining the voltage level of the aircraft itself the same as that of its immediately surrounding environment. Thus, if the aircraft B is kept at the same voltage or charge level as that of the adjacent atmosphere, wherever the aircraft position is, in the clouds, at high altitude or adjacent the ground, there will not exist a difference of potential between the aircraft and its environs. Hence, uncontrolled arcing or sparking from points (not probes) will be prevented. The present system endeavors to constantly reduce the potential gradient between the aircraft B and its ambient to +1 kilovolt, this being considered to be a level which will avoid haphazard discharges from normal aircraft points, which will minimize radio interference and which will avoid serious shock to ground personnel. The accomplishment of the maintenance of the minimum specified potential difference is provided by discharging a current of proper polarity or corona through the high impedance probes into the atmosphere whereby the charge on the aircraft will be substantially the same as that of the electrostatic field surrounding the craft. Note that we are never primarily interested in what the value of the potential of the aircraft is with respect to earth except when the craft approaches the earth during take-off or in landing.

Referring to the block diagram of FIGURE 1, the following occurs: As the charge builds up on the aircraft B, as a result of triboelectric charging for example, the electrostatic voltage of the aircraft also increases. However, as indicated in the next preceding paragraph, we are not grossly interested in the absolute value of the aircraft's voltage or charge, and in connection with the instant sensing and compensation system, the airframe is made the base reference of zero level against which the surrounding field is compared. The sensor A continuously indicates the polarity and amplitude of this ambient proximate field with respect to the base reference of the aircraft proper (skin, surface or airframe) and transmits an amplified signal of this D.C. measurement to the compensator C. The compensator C modifies the signal to take into account the dynamic characteristics of the helicopter B and the high voltage generators D1 and D2. This signal is then channeled to one or the other of the two outputs, depending upon the polarity of the signals, i.e.— the polarity of the charge on the aircraft. Both channels thereafter are identical, except for the output polarity. The signal is amplified again in the gain control units C1 and C2 whereupon it leaves the low voltage unit and goes directly to the appropriate high voltage generator unit. After one additional state of power amplification in the servo amplifiers F1 and F2, the signal drives the corresponding voltage multiplier G1 or G2. The multiplier units provide and transmit high voltage to the corona points or wicks E which are coupled thereto and mounted at the ends of the cells 16 and 18.

Referring now to the block diagram of FIGURE 10, the electrostatic discharger can be considered to be a closed servo loop such that in operation the system discharging current, $i_d$, will cancel the natural charging current, $i_n$, in such a manner that the aircraft potential, $P_v$, will remain below the limit of the corresponding safe level established for each aircraft type. The transfer functions for each of the loop elements are as follows:

Aircraft:
$$\frac{P_v}{I_t} = \frac{1}{Cs}\left(\frac{\text{volts}}{\text{ampere-second}}\right)$$

Sensing unit:
$$\frac{V_s}{P_v} = \frac{K_s}{1+T_s s}\left(\frac{\text{volts}}{\text{volt}}\right)$$

Polarity and control unit:
$$\frac{V_c}{V_s} = \frac{K_c(1+T_H s)}{(1+T_c s)(1+T_p s)}\left(\frac{\text{volts}}{\text{volt}}\right)$$

High voltage generators:
$$\frac{V_H}{V_c} = \frac{K_H}{1+T_H s}\left(\frac{\text{volts}}{\text{volt}}\right)$$

Corona point probes:
$$\frac{i_d}{V_H} = K_c\left(\frac{\text{amperes}}{\text{volt}}\right)$$

where:

$P_v$ = absolute potential of the particular aircraft (volts)
$i_t$ = net current flowing into the aircraft having anti-static system
$C$ = capacitance of particular aircraft (farads)
$s$ = Laplacian differential operator, 1/second
$V_s$, $V_H$, $V_c$ = voltage output of sensor, high voltage generator and corona probes respectively (volts)
$K_s$, $K_p$, $K_H$, $K_c$ = Gain constants of sensor, polarity and control unit, high voltage generator, and corona probes respectively
$T_s$, $T_p$, $T_H$, $T_c$ = Time constants of respective system components Since the gain factors (K) and the time constants (T) depend upon system design, and the first transfer function depends upon the aircraft capacitance, the analysis of a servo loop with the above transfer functions leads to the open loop transfer function:

$$F_o = \frac{i_d}{i_t} = \frac{K}{Cs(1+T_s s)(1+T_p s)(1+T_c s)}$$

and where the time constants can be reduced by appropriate design to a value sufficiently low as to be negligible, the transfer functions for the sensing and control units can be rewritten, as follows:

Sensing unit:

$$\frac{V_s}{P_v} = K_s$$

Polarity and control units:

$$\frac{V_c}{V_s} = K_p$$

and FIGURE 10 is the block diagram of a discharging system having transfer functions represented by the foregoing equations.

From the above, it can be shown that the system response to a step function of amplitude $K_1$, will be, $$i_d = \frac{K_1}{s\left(1 + \frac{C}{K}s + \frac{CT_c}{K}s^2\right)}$$

or $$P_v = \frac{K_1(1+T_c s)}{K\left(1 + \frac{C}{K}s + \frac{CT_c}{K}s^2\right)}$$

which represents in operational notation the time history of the aircraft potential after receiving a step increase of natural charging current of magnitude $K_1$.

The solution of the last-designated equation is:

$$P_v = \frac{K_1}{K}\left\{1 + \frac{1}{\sqrt{1-\xi^2}}[1 - 2T_c\xi\omega_1 + T_c^2\omega^2]^{1/2} e^{-\xi\omega_1 t} X\sin(\omega_1\sqrt{1-\xi^2}\,t + \psi)\right\}$$

where:

$$\psi = \tan^{-1}\frac{T_c\omega_1\sqrt{1-\xi^2}}{1 - T_H\xi\omega_1} - \tan^{-1}\frac{\sqrt{1-\xi^2}}{-\xi} =$$

(phase angle of system)

$$\omega_1 = \left(\frac{K}{CT_c}\right)^{1/2} = \text{(natural frequency of system)}$$

$$\xi = \frac{1}{2}\left(\frac{C}{KT_c}\right)^{1/2} = \text{(damping ratio of system)}$$

In these parameters, the value of C is determined by the aircraft capacitance and the values of K and $T_H$ chosen to obtain the desired system performance. The value of the overall system gain, K, must be necessarily high in order to maintain at a low value the residual aircraft voltage, which acts in this system as the error signal of the control loop. Therefore, if a reasonable system damping is to be achieved, the value of the high voltage time constant, $T_H$, must be made as low as possible. Note that the values of the damping ratios selected will be dependent upon the particular aircraft, i.e.—for vertical-take-off-and-landing aircraft which is subject mainly to triboelectric charging or for high speed aircraft in which induction charging predominates. From a plot of the curves (not shown here), it is also obvious that the low damping associated with the lowest time constants leads to large potential overshoots.

Referring now to FIGURE 2, the electrostatic field surrounding the aircraft B is sensed by a rotating vane generating voltmeter A whose design is in the general shape of a cylindrical can 30 which may contain all of the low voltage circuitry in modular and fully transistorized form. The sensor A itself consists of a fixed plate or vane 32 which is located outside of the aircraft B essentially flush with its skin 15 and insulated therefrom. The fixed vane 32 is in the shape of diametrically-opposed 90° segments which are alternately exposed to and shielded from the aircraft field by a rotating vane 34 of generally the same configuration. The vane 34 is grounded and is rotatably driven at high speed (approximately 18,000 r.p.m.) by a small electric motor 36.

Referring now to FIGURE 9A, the fixed vane 34 is connected to the input of a four stage amplifier A1 and produces an A.C. signal which approximates a sine wave of twice the frequency of the speed of the motor 36. Because of the high impedance levels involved at the input of the amplifier A1, the first stage $T_1$ employs a field effect transistor of a very low noise level, such as a C614. The field effect transistor is one having a high input impedance, for example, one having the general characteristics of a vacuum tube pentode. This is followed by three stages of A.C. amplification, $T_2$, $T_3$, and $T_4$, which serve to boost the signal up to a workable level suitable for its transmission to the polarity discriminator. A voltage regulating zener diode Z1 and a resistance-capacitance filter associated therewith provide from a conventional 28-volt aircraft power supply a regulated and filtered source of B+ to the amplifier A1.

The signal is then sent to the compensating unit C where it is power amplified at emitter-follower coupled stages $T_5$ and $T_6$ preparatory to being rectified by a synchronous motor switch 38. The switch 38 is mounted on the slip rings of the motor 36 and is automatically operated by the motor shaft which grounds test point #1 at the peak of each cycle. Since the phase of the wave form reverses with the reversal of field, the switch 38 clamps the signal at test point #1 at either its most negative or most positive peak. That is, the switch 38 is coupled with and is actuated by the motor 36 slip rings and functions as a mechanical chopping relay to demodulate the A.C. signal amplified by the stages $T_1$ to $T_4$. Note that the rotation of the rotary vane 34 has originally converted the ±D.C. voltage difference between the airframe ground and the atmospheric field into an ±A.C. voltage suitable for amplification but having a clamped reference to airframe ground. Now the switch 38 demodulates the signal of the correct polarity and which has been amplified to a magnitude for actuating the servo amplifier F1 or F2 with minimum error. This signal is then filtered at 40 through a choke circuit, and a D.C. voltage proportional to the field is obtained with a polarity which is the same as that of the aircraft B.

Thus, the output of the sensing device A is an A.C. signal of an amplitude that is proportional to the electrostatic field existing on the sensing head position. A 180° phase shift of this signal is produced by polarity reversals of the aircraft field. The polarity discriminator itself consists of a phase sensitive circuit which determines the phase of the sensor output by comparing this signal with a synchronized phase reference signal which is also provided by the sensor A. The discriminator includes automatic slip ring switches 38 (located on the slip rings of the motor 36), a 2.2 microfarad capacitor 39 and a pair of 1N2070 diodes 44, 45. Note that the transistor pair $T_5$ and $T_6$ (T1484 and 2N618) are arranged as emitter-follower to lower the impedance of the sensor A and to further bring up its power. Note also that the signal proceeds through a phase-lead network 41 to compensate for the aircraft electric constants set forth in FIGURE 10.

A chopping signal is then applied to diode ring modulator 42 which remodulates the compensated signal to a 400 c.p.s. square wave (the frequency of the chopping signal). The 1N2070 diodes in pair 44, 45 following the bridge 42 each pass only one polarity of signal. Each signal is then individually filtered and routed through the corresponding gain control units C1 and C2. See FIGURE 9B. The control units C1 and C2 include respective choke filters 46, 47 followed by resistive dividers 48, 49 (primarily for test purposes) and then gain controls 50, 51. The output from the low voltage control unit is then fed into the power amplification stages F1 and F2 of the high voltage generator D.

The power amplifiers F1 and F2 are each miniature transistorized single-ended input, 400 c.p.s., push-pull output such as Model No. A3104–01A (LTRA) servo amplifier manufactured by Kearfott Mfg. Division of General Precision Inc., Little Falls, New Jersey and described in its bulletin dated March 16, 1961, and revised September 30, 1962. The Kearfott amplifier was selected because of its small size, and this is merely set forth as an example since any conventional power amplifier may be utilized. These amplifiers boost the signal up to a power level which is sufficient to drive the high voltage multiplier units G1 and G2 through transformers 55 and 56 as shown in FIGURE 8. Switch 12 controls the power to the entire low voltage system and is monitored by pilot lamp 13 whereas switch 52 controls the power amplifiers F which are monitored by pilot light 53.

The checkerboard portions shown in FIGURES 9A and 9B are schematic representations of electrical terminal connectors. The blocks on one side of the medial longitudinal line in each pattern represent respective corresponding female portions for example. Adjacent blocks on opposite sides of the medial line are coupled so as to electrically connect a lead extending up to one block to a lead connected to a transversely adjacent block.

The high voltage multipliers G1 and G2 rectify and multiply the signal delivered from the power amplifiers F1 and F2 through transformers 55 and 56 to a sufficient voltage level for supplying the corona points E with an ion formation at the tips thereof which when exposed to the air stream will deliver the required current flow out of the aircraft. The schematic representation of the multipliers is shown in FIGURE 8 and includes a plurality of series-coupled diodes 60 which are arranged in a diagonal ladder and whose adjacent ends are connected to corona suppression balls 62. A plurality of capacitors 64 (500 pf. for example) are between adjacent balls 62 which run in a line on each side of the diodes to define two series-doubler rectifying circuits coupled as a cascaded diode-capacitor network. The use of the corona balls 62 at all intersecting points eliminates the presence of corona discharge at all points but the probes themselves. Resistive dividers 66 are incorporated in each of the multipliers G for the purpose of monitoring the voltage of the generators D. The voltage build-up in this design is very gradual along its longitudinal axis and, consequently, low voltage gradients can be achieved. The geometric construction of the multipliers 5 and 6 as a rigid ladder which is adapted to be inserted as a unit within the cells 16 and 18. The corona points E are directly coupled to the end of the multipliers so as to eliminate high voltage cable or wire as much as possible between the high voltage unit and the corona points. This avoids wire capacitance which would otherwise act as a major obstacle towards achieving sufficiently rapid system response.

The corona tips E discharge sufficient current to maintain the aircraft potential between plus or minus one kilovolt with reference to the immediately surrounding atmosphere when aloft and with respect to earth when landing or during take-off. The energy level of the one kilovolt on a large helicopter is approximately one millijoule which is the threshold of human perception. That is, at this level, if a person were to touch the helicopter B he might just barely ascertain that there was a slight charge upon the aircraft, and one millijoule corresponds to an energy level considered safe for handling of volatile fuel-air mixtures.

The discharge probes E, in the embodiment shown, are mounted at the ends of the relatively flat cells 16 and 18, one each at the leading and trailing edges thereof. The use of a plurality of wicks as the corona points eliminates the hazardous aspects of charged metallic points. Moreover, the inherent high impedance of the wick fibers substantially reduces the dangers associated with the operation and maintenance of the discharging system and its high voltage generator. It is to be observed that almost the entire terminal discharge goes through the wicks E which are operated as an active system which keeps the corona at a low level. Since the level is low, the only discharge occurs through the wicks themselves rather than through the natural discharge points on the aircraft thereby affording a noiseless discharge system which avoids communication hash.

Although this invention has been described in considerable detail, such description is intended as being illustrative rather than limiting, since the invention may be variously embodied, and the scope of the invention is to be determined as claimed.

What is claimed is:

1. An automatic electrostatic discharging system for aircraft comprising sensing means for continuously measuring with respect to the aircraft the potential and the polarity of the electrostatic field immediately surrounding the aircraft and having an output electrical signal which is a function of the strength and polarity of the field relative to the aircraft, positive and negative high voltage generator means adapted to be actuated by respective positive negative electrical signals, means to discriminate selectively between the positive and negative signal output from said sensing means, means actuated by the discriminated signals actuating the corresponding high voltage generator means, and corona discharging means coupled with the respective high voltage generator means so that a D.C. current will be discharged from said corona discharge means into the atmosphere whereby the potential gradient between the airframe and its environmental field will be reduced to a predetermined level so as to enable the aircraft to be maintained constantly at substantially the same potential level as its environs.

2. The invention of claim 1 including compensating means to compare the current output from the system with that required to neutralize the natural charging current being imposed upon the system as a closed servo loop, and means to amplify the signals delivered through the system in order to reduce error, wherein the transfer functions for the dynamic characteristics of the aircraft and the discharging system represented as a closed loop are:

aircraft: $1/Cs$ sensing and compensating means:

$$K_s K_p = \frac{(1+T_H s)}{(1+T_c s)}$$

high voltage generator means:

$$\frac{K_H}{1+T_H s}$$

corona discharge means: $K_c$ where:

$C$ = capacitance of the aircraft in farads
$s$ = Laplacian differential operator in 1/second
$T_c, T_H$ = time constants of high voltage generator means and compensating means respectively; and
$K_s, K_p, K_H, K_c$ = gain constants of sensing means, compensating means, high voltage means and corona discharge means respectively.

3. In an electrostatic discharging system for aircraft, a continuously and automatically operating active type compensator comprising sensing means for continuously measuring with respect to the aircraft frame the polarity and electrostatic potential of the electrostatic field immediately surrounding the aircraft and providing an electrical output signal which is a function of the potential difference being measured, low voltage power amplifier means disposed within the aircraft, high voltage multiplier means mounted on the exterior of the aircraft and electrically coupled with said power amplifier means, means detecting the polarity and amplitude of the electrical signal output from said sensing means and actuating said low voltage power amplifier means, and corona discharge means directly connected with said voltage multiplier means, said voltage multiplier means constituting a cascade of doubler networks.

4. An automatic electrostatic discharging system for aircraft comprising a sensor including a rotating vane generating voltmeter having a fixed vane with diametrically-opposed 90° segments substantially flush the exterior of the aircraft and a grounded rotor vane of substantially the same configuration as the fixed vane and rotatable in overlying relation therewith so that the fixed vane is alternately exposed to and shielded from an electrostatic field about the aircraft and has an electrical signal thereon which is a function of the potential difference between the field and the aircraft, amplifying means coupled with said sensor and boosting the signal therefrom, first high voltage generator means adapted to be activated by a signal input therein, second high voltage generator means adapted to be actuated by a signal input therein, means discriminating the signal from the amplifying means and selectively actuating said first and second high voltage means, and corona discharge means coupled with each of said high voltage generator means delivering an ionizing discharge approximately equal to the natural charging current into the air stream about the aircraft sufficient to maintain the aircraft potential between plus and minus one kilovolt with respect to its surroundings.

5. The invention of claim 4 wherein each of said high voltage generator means comprises a low voltage amplifier circuit mounted within the interior of the aircraft, and a high voltage amplifier circuit unit mounted exterior to said aircraft.

6. The invention of claim 5 wherein said high voltage circuit unit comprises a cascade of doubler networks.

7. The invention of claim 5 wherein said corona discharge means comprises a plurality of high impedance wick fibers directly coupled in a bundle with said voltage-doubler network at the output thereof.

8. An automatic electrostatic discharging system for aircraft comprising sensing means for continuously measuring with respect to the aircraft frame the polarity and electrostatic potential of the electrostatic field immediately surrounding the aircraft and providing an electrical output signal which is a function of the potential difference being measured, D.C. high voltage generator means adapted to deliver an output of each polarity, probe discharging means supported exteriorly on the aircraft, electrically insulated therefrom, and having discharging portions remotely located with respect thereto, said probe means being coupled to the high side of said high voltage generator means, and means receiving the electrical output signal from said sensing means discriminating the polarity thereof and actuating the high voltage generator means so that the D.C. voltage thereacross will cause a current to be discharged from said probe means into the atmosphere whereby the potential gradient between the airframe and its environmental field will be reduced to a predetermined level so as to enable the aircraft to be maintained constantly at substantially the same potential level as its environs.

9. The invention of claim 8 including insulated housing means exteriorly supported upon said aircraft and encasing said high voltage means externally thereto.

10. An automatic electrostatic discharging system for aircraft comprising sensing means for continuously measuring with respect to the aircraft frame the polarity and electrostatic potential of the electrostatic field surrounding the aircraft and delivering an electrical output signal which is proportional to the polarity and strength of the field being measured with reference to the aircraft, first D.C. high voltage generator means associated with said aircraft adapted to provide an output of positive polarity with respect to the frame thereof, second D.C. high voltage generator means associated with said aircraft and adapted to provide an output of negative polarity with respect to frame, probe means supported exteriorly with respect to the aircraft, electrically insulated therefrom, and having discharging portions remotely located with respect thereto, said probe means being electrically coupled to the high side of each of said high voltage generator means and the low side of said high voltage generator means being electrically coupled to the aircraft frame, and means receiving the electrical output signal from said sensing means, discriminating the polarity thereof, and selectively actuating the appropriate high voltage generator means so that a D.C. current of corresponding polarity will be discharged from said probe means into the atmosphere until the potential gradient between the aircraft and its environmental field will be reduced to a predetermined level whereby the aircraft will be maintained at substantially the same potential level as its environs.

11. The invention of claim 10 including insulated housing means exteriorly supported upon said aircraft and encasing said high voltage means externally thereto.

12. An automatic electrostatic discharging system for aircraft comprising sensing means for continuously measuring with respect to the aircraft proper the polarity and electrostatic potential of the electrostatic field immediately surrounding the aircraft, said sensing means providing an electrical output signal which is a function of the potential difference being measured, generator means adapted to yield a D.C. high voltage output with respect to the aircraft proportional to the electrical output signal of said sensing means, probe means supported exteriorly on the aircraft, electrically insulated therefrom, and adapted to discharge a corona current into the atmosphere, said probe means being electrically coupled to the high voltage output of said generator means, and means detecting the electrical output signal from said sensing means and actuating said high voltage generator means so that the D.C. voltage thereacross will cause a current to be discharged from said probe means into the atmosphere whereby the potential gradient between the airframe and its environmental field will be reduced to a predetermined level so as to enable the aircraft to be maintained constantly at substantially the same potential level as its environs.

13. The invention of claim 12 including insulated housing means exteriorly supported upon said aircraft and encasing said high voltage means externally thereto.

14. An electrostatic discharging system for aircraft comprising a closed housing of electrically insulative material projecting outwardly from the aircraft, a high voltage multiplier network mounted within said housing electrically insulated from said aircraft and having a high side adjacent the distal end of said housing, corona probe means extending outwardly from the distal end of said housing and being electrically coupled to the high side of said high voltage multiplier network, low voltage amplifier means supported within the interior of the aircraft and being coupled at its output side to the input of said multiplier network, and means to apply a signal to said low voltage amplifier of a magnitude and polarity which is a function of the potential with reference to the aircraft of the electrostatic field immediately surrounding the aircraft whereby a current will be discharged from said probe means into the atmosphere so as to reduce the potential difference between the aircraft and its environs to a predetermined level, to minimize return flow of the corona discharge back upon the aircraft, to reduce insulation requirements of the system, and to minimize danger of shock to operating personnel within the aircraft.

15. The invention of claim 14 wherein said high voltage multiplier network comprises a cascade of rectifier-capacitor, doubler circuits.

References Cited by the Examiner
UNITED STATES PATENTS

| | | | |
|---|---|---|---|
| 2,333,975 | 11/1943 | Bennett | 324—32 X |
| 2,815,483 | 12/1957 | Kaufman | 324—32 X |
| 2,993,165 | 7/1961 | Jauch | 324—32 X |
| 3,035,208 | 5/1962 | Clark | 317—2 |

MILTON O. HIRSHFIELD, *Primary Examiner.*

SAMUEL BERNSTEIN, *Examiner.*

J. A. SILVERMAN, *Assistant Examiner.*